United States Patent [19]

Weber

[11] 4,344,121
[45] Aug. 10, 1982

[54] CLOCKED LOGIC POWER SUPPLY

[75] Inventor: Harold J. Weber, Sherborn, Mass.

[73] Assignee: Coulter Systems Corp., Bedford, Mass.

[21] Appl. No.: 208,824

[22] Filed: Nov. 20, 1980

[51] Int. Cl.³ .......................... G05F 1/56; H02P 13/32
[52] U.S. Cl. ...................................... 363/16; 323/283; 323/284; 363/21; 363/60
[58] Field of Search ....................... 363/21, 59, 60, 62, 363/15, 16; 328/282, 283, 284; 330/199; 307/240, 296 R, 296 A, 297

[56] References Cited

U.S. PATENT DOCUMENTS

| 3,947,704 | 3/1976 | Blauschild | 307/297 |
| 3,995,177 | 11/1976 | Sirocka et al. | 307/297 |
| 4,028,596 | 7/1977 | Weber | 363/60 |
| 4,199,806 | 4/1980 | Patterson | 363/60 |

FOREIGN PATENT DOCUMENTS 2325368 11/1973 Fed. Rep. of Germany ...... 307/297

OTHER PUBLICATIONS

Electronics Engineering, vol. 12, No. 640, p. 17, Jul. 1980.
Elekt. Entwickl., (Germany), vol. 14, No. 9, pp. 34-36, Sep. 1979.

Primary Examiner—William H. Beha, Jr.

[57] ABSTRACT

Logic controlled regulated power supply which produces a d.c. output potential which is stabilized at a predetermined value through the variation of the average efficaciousness of a train of rectified clock pulses. The level where the predetermined value is satisfied is sensed to produce a logic level which inhibits further clock pulse efficacy at least until such time as the d.c. output potential, as accumulated across a charge holding capacitor, dissipates to a level less than the predetermined value through the impedance of an external load whereupon the flow of clock pulses are resumed for at least the period of time necessary to integratively reaccumulate sufficient rectified charge in the charge holding capacitor to again exceed the predetermined value. This cycle of enablement and disablement of clock pulse flow continues ad infinitum thereby maintaining a relatively constant d.c. level across the terminals of the charge holding capacitor.

24 Claims, 15 Drawing Figures

FIG. 15

CLOCKED LOGIC POWER SUPPLY

SUMMARY

The gist of the invention teaches a high efficiency electric power supply regulator which acts to provide a unipolar rectified clock pulse signal across a charge holding capacitor which has a substantially constant average d.c. value relative to time. A stream of clock pulses couple with a logic gate input. The gate has at least one other effective input thereto serving as the control which can act to either pass or inhibit the flow of the clock pulses to the gate output. In its essential form, these output pulses are initially allowed to flow via way of a unipolar device, e.g. a rectifier diode or the like, to deliver electric charge energy into a charge holding capacitor acting as an energy accumulator. The gate control input is coupled with the charged terminal of the holding capacitor and further the gate control input is predetermined to have a finite threshold level characteristic whereby when the control input level is below this threshold level, the gate allows output pulses to flow for rectification and charge accumulation; and further when the control input level is above this threshold level, the gate inhibits output pulses from flowing forth. This electrical up and down value change at the control input, wrought by the alternate charge of the accumulator level by the active flow of clock pulses from the gate, and the dissipation of the accumulated charge by a load impedance coupled thereacross results in a relatively stable d.c. level to appear across the charge accumulator terminals and the load.

The invention further teaches how d.c. values other than that inherent in the finite d.c. threshold response level of the control input may be provided.

The invention continues to teach how d.c. values at the output of the regulator may be established to have a d.c. polarity opposite that provided from the primary d.c. source.

The invention serves to teach how d.c. values at the output of the regulator may be established to have a d.c. potential level greater than that provided from the primary d.c. source.

The invention provides teaching for adapting the gist of the invention to provide considerable levels of output power with high electrical efficiency.

The invention gives instruction for the adaptation of a complimentary metal oxide semiconductor logic function as substantially the complete regulator active control element including gating and the level sensing.

In particular, the invention shows the artisan how a d.c. regulator function can be achieved using the elements residing within the usual logic circuit arrangement, including a logic system clock pulse stream and a logic gate control function, together with few ancillary passive components, to achieve excellent electrical results with low additional system cost and with a high degree of net electrical efficiency.

DESCRIPTION OF DRAWINGS

Five drawings comprising fifteen figures serve to illustrate the gist of the invention.

DESCRIPTION OF INVENTION

Figure 1:
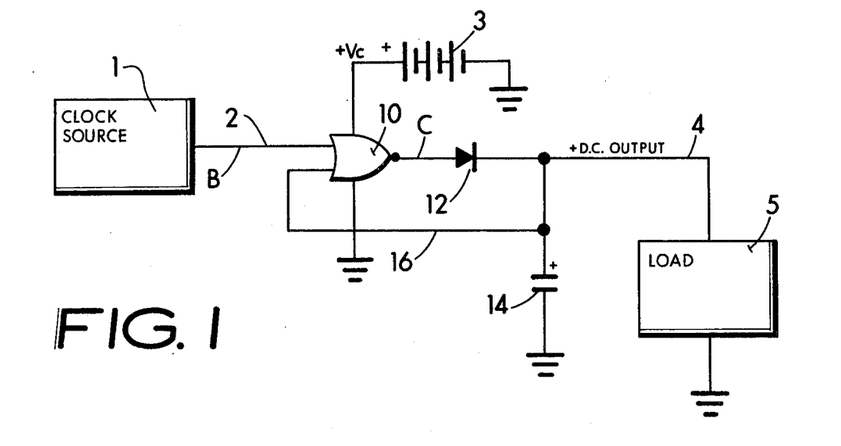
FIG. 1 Illustrative circuit for the essence of the invention showing the control feedback directly to the charge accumulator.

The gist of the invention is depicted in FIG. 1. A clock source 1 provides a continuum of pulses on line 2, usually with a repetition of several kilohertz. The pulses couple with NOR gate, preferably a C-MOS logic element such as the CD4001. The result is that, upon initial start-up, the other input 16 is logic $\overline{\text{LOW}}$, and the clocked input 2 is pulsed $\overline{\text{LOW}}$. During this period, when both inputs are low, the output of the gate is HIGH. This HIGH state of course alternates with a $\overline{\text{LOW}}$ state as the clock pulses alternate on the input 2. The desired effect is that, when the gate output is HIGH, the HIGH state electric potential, which in itself is derived from the $+V_c$ value produced by the source 3, will be conducted through diode 12 to charge the accumulator capacitor 14. The charge accumulation is not instantaneous, but rather is limited by the intrinsic "on" impedance of the gate 10 and to a lesser extent by the diode forward impedance. In addition, a fixed value of resistance (not shown) may be installed in series with the diode. As charge accumulates in the capacitor 14 after a suitable number of pulse cycles, a value is reached where the electric potential on gate input line 16 appears as a HIGH state to the gate, inhibiting further gate function and holding the output $\overline{\text{LOW}}$. Further accumulator 14 charging ceases. The existing charge is dissipated by the internal impedance of the load 5, causing the electric potential across the accumulator 14 and thus that on gate input 16 to drop below the gate threshold value, thereby appearing as a $\overline{\text{LOW}}$ state on the input which re-enables the gate to commence recharging the capacitor 14. This enable-inhibit-enable, etc., action on gate input line 16 continues ad infinitum as long as the other predetermined circuit conditions permit. The result is a relatively steady +D.C. OUTPUT value 4 which is about equal to the NOR gate 10 input voltage threshold $V_I$.

Figure 2:
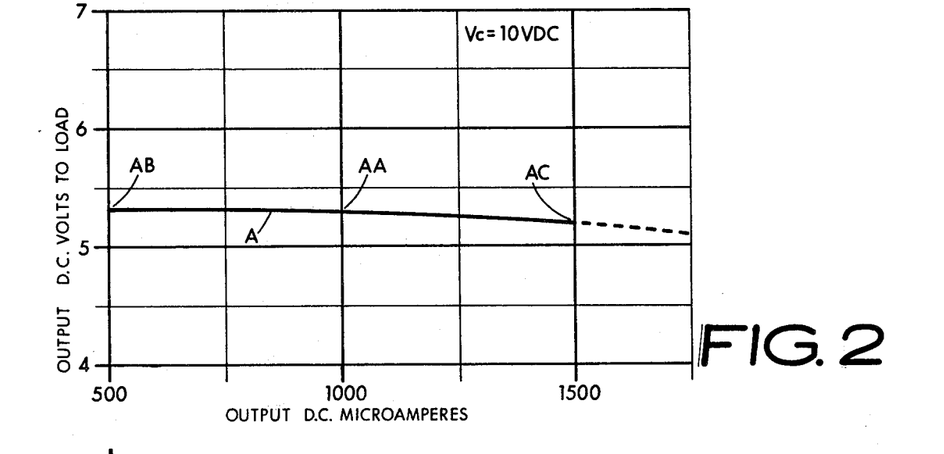
FIG. 2 Plot showing voltage regulation with a 3:1 current change for the circuit of FIG. 1.
Figure 3:
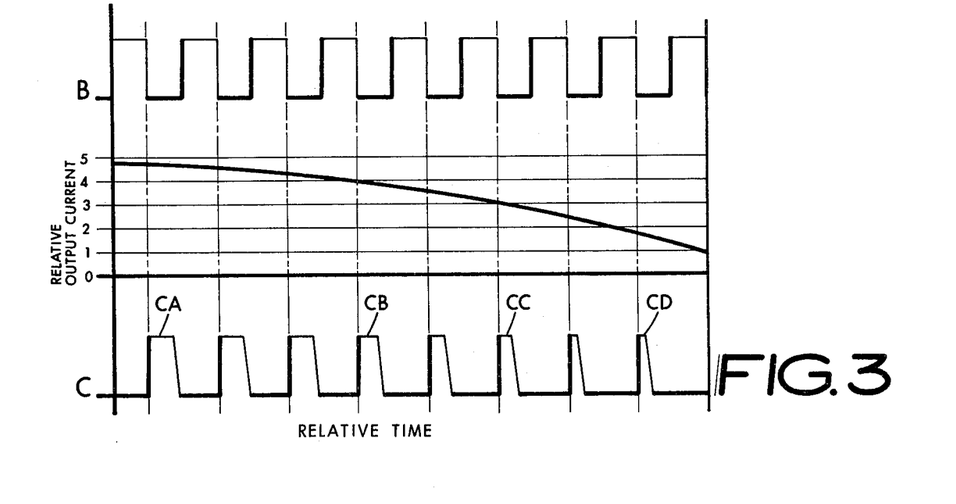
FIG. 3 Signal representations of waveform states in FIG. 1 relative to output current changes.

The performance of a circuit patterned after the electrical hookup of FIG. 1 is graphically depicted in FIG. 2. With a $+V_C$ value of +10 volts d.c., the measured output for a 1000 microampere load AA is about +5.6 volts in a tried model. The exact value will, of course, depend on the intrinsic threshold level $V_I$ of the NOR gate. What is depicted, most importantly, is the regulation afforded by the circuit over a wide range of load variation: e.g. as the load varies from 50% at point AB to 150% at point AC of normal, the output voltage varies only from about 5.7 volts to 5.4 volts or 5% over a 3:1 change in load current. The charge between 500 $\mu A$, point AB, and 1,000 $\mu A$, point AA is only 0.1 volts or about 1.8%. The inherent regulation is excellent. The waveforms produced within the circuit like that of FIG. 1 are clearly shown in FIG. 3. The clock pulses B are shown to have about 50% duration, although substantially shorter or longer durations may be predetermined to be useful. The relative output current is shown to decrease from a maximum value of about 4.8 units to about 1 unit. The effect this introduces into the duration of individual charging pulses C is depicted, with the pulse CA having a much longer duration for the higher currents, whilst the duration is considerably shortened CB, CC, CD for the lower currents. This shows how the resulting pulse duration integratively relates to the energy required to constantize the charge across the accumulator capacitor.

Figure 4:
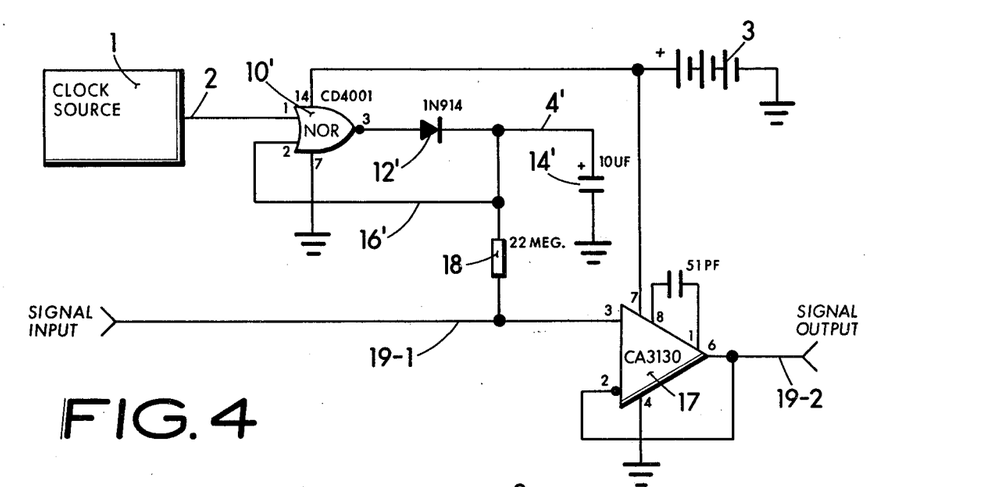
FIG. 4 Practical embodiment based on FIG. 1 showing typical circuit values and load coupling.

A modeled circuit appears in FIG. 4 showing the instant power supply in combination with an operational amplifier, therewith serving to establish the operating point bias for the amplifier input. The NOR gate 10' charges a capacitor 14' through the steering diode 12'. This produces a potential across the capacitor 14' on line 16' which couples through a resistor 18 to the operational amplifier 17 input 19-1, suitably biasing the amplifier about midway of the $+V_C$ value from the battery 3 and therefrom producing an output 19-2. The advantage afforded in this application is that of minimized battery drain (power consumption). The only battery power required is that needed to initially charge capacitor 14', then just so much as is needed to replace the losses intrinsic to the capacitor, and associated with the NOR gate function and the amplifier input current. These levels are all very small and only slowly deplete the capacitor charge. The power consumption is thus much less than that associated with the more usual tapped bleeder resistor arrangement which may be bridged across the battery source.

Figure 5:
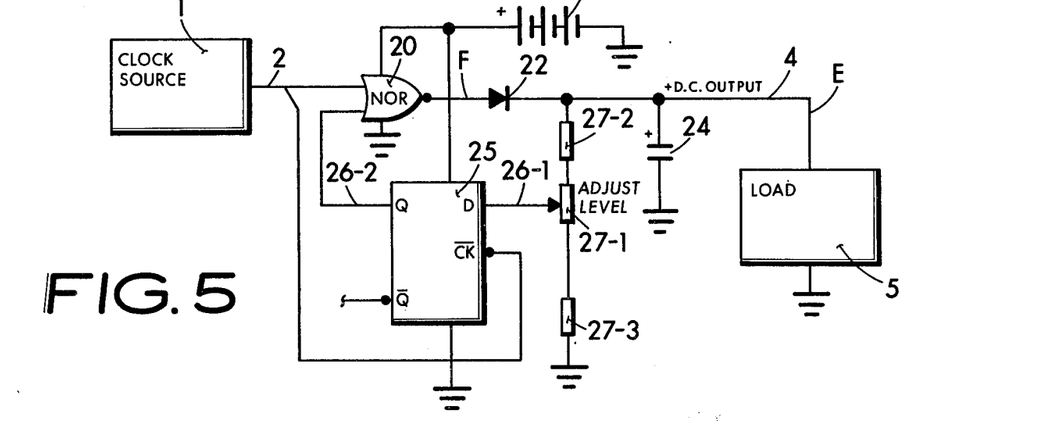
FIG. 5 Embodiment including the use of a bi-stable element for synchronizing the control state with the clock.

FIG. 5 teaches a further improvement wherein each charging pulse is of substantially constant duration, and the numbers or spacing of pulses is various. A clock source 1 produces pulses 2 which not only couple to the controlling gate 20, but also to the clock $\overline{CK}$ input of a "D" type C-MOS flip-flop 25. The "D" input level behavior of the C-MOS flip-flop is comparable to the previously shown gate function: i.e., the $V_I$ level is well defined. The initial state provides that the NOR input 26-2 is $\overline{LOW}$, thereby producing charging pulses at the gate 20 output F which couple through diode 22 to charge capacitor 24 resulting in an accumulated +d.c. level on output line 4.

Figure 6:
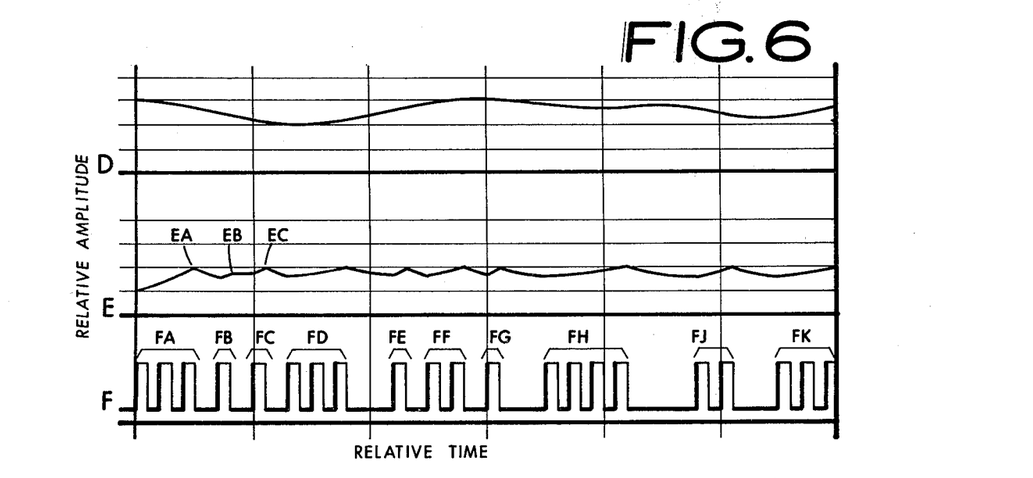
FIG. 6 Waveform representations illustrative of the active levels found in the circuit of FIG. 5.

As this charge accumulates, it is sampled by a voltage divider comprising resistors 27-1, 27-2, 27-3. The tapped voltage on line 26-1 couples with the "D" input of the flip-flop 25. When the level rises ABOVE the $+V_I$ level of the input, the Q output switches HIGH on the NEXT negative edge transition of the $\overline{CK}$ input. In a like way, when the $V_I$ value slips below the threshold, due to discharge of the capacitor 24 by the load 5, the Q output switches LOW, again on the NEXT negative edge transition of the $\overline{CK}$ flip-flop input. The waveforms of FIG. 6 show this operation. As the load D varies, the instant voltage E across the capacitor 24 charges and discharges at different rates, related to the various pulse groups FA, FB, FC, etc. The high transition EA ends the group FA for example. This circuit affords advantage when used in clocked logic systems (computers, etc.) because any noise pulse which might be produced is synchronized with the overall system clock transitions.

Figure 7:
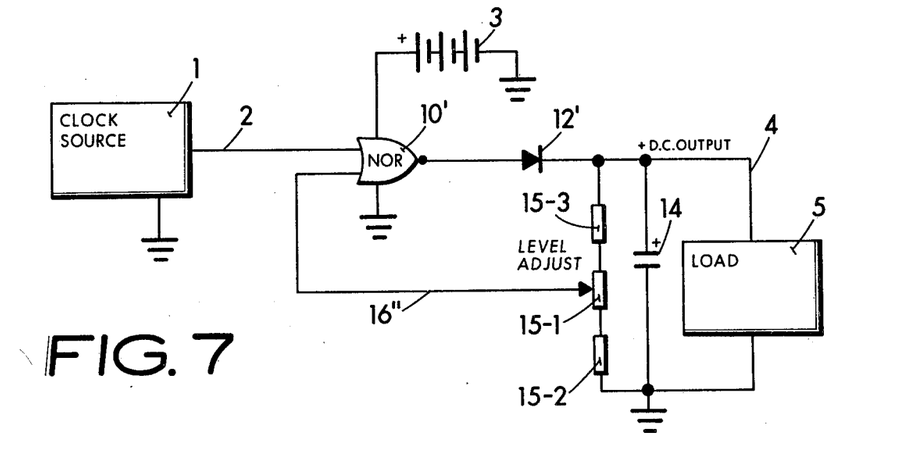
FIG. 7 Illustrative circuit for the essence of the invention showing the control feedback coupled back by way of a ratio voltage divider.
Figure 8:
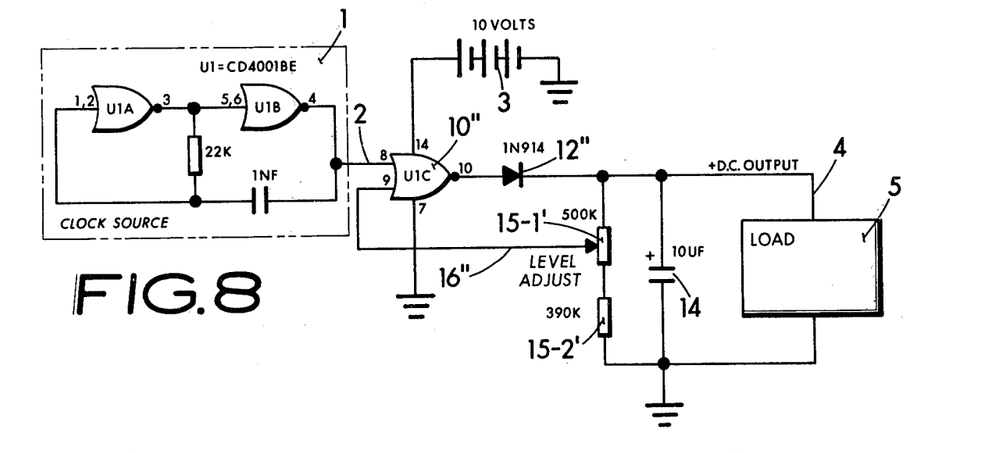
FIG. 8 Practical embodiment based on FIG. 7 showing typical circuit values and load coupling.
Figure 9:
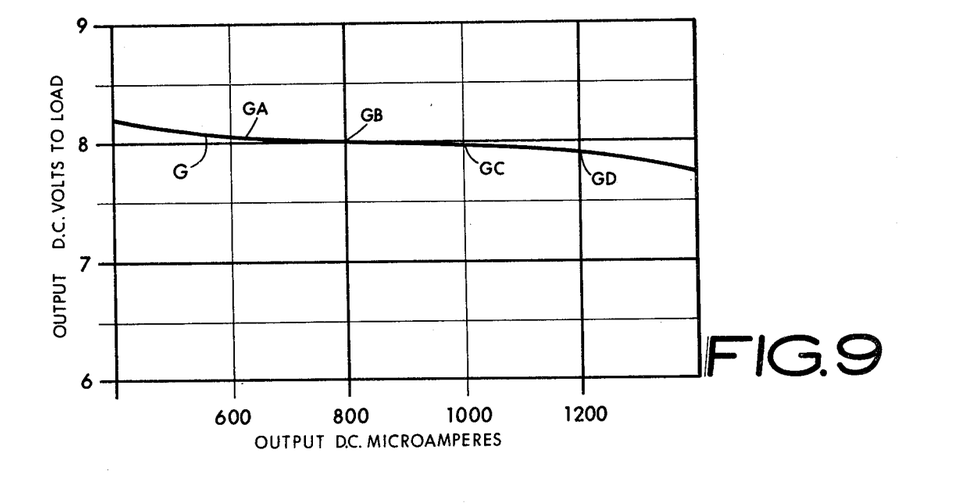
FIG. 9 Plot showing voltage regulator with a 2:1 current change for the circuit of FIG. 8.
Figures 10, 11:
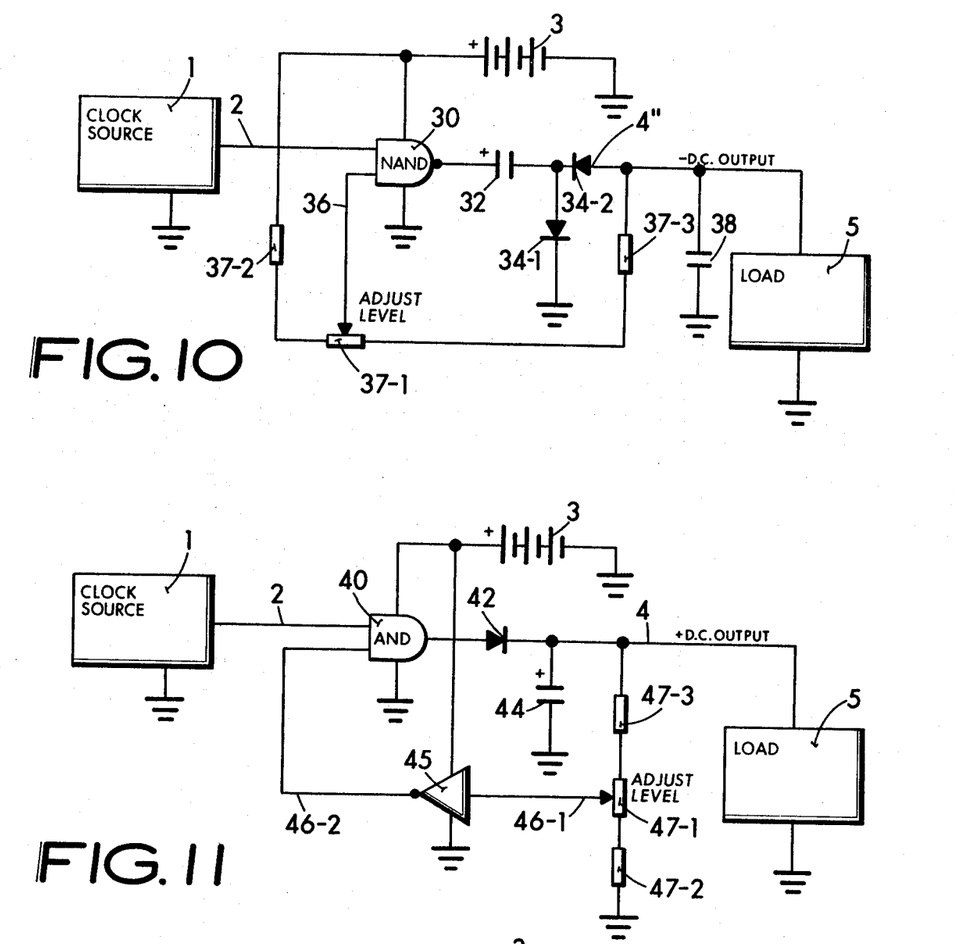
FIG. 10 Embodiment of the invention's essence for producing a negative output potential.
FIG. 11 Embodiment of the invention's essence showing the use of a separate level detector function in the feedback path.

The adjustment of the output voltage produced by a circuit like that of FIG. 1 is shown in FIG. 7. A voltage divider comprising resistors 15-1, 15-2, 15-3 is bridged across the d.c. output, with the tapped connection 16'' controlling the gate. The result is the d.c. value must reach a somewhat higher, and adjustable, value before the $V_I$ threshold of the NOR gate 10' is satisfied. Otherwise circuit operation is comparable to that of FIG. 1. A model circuit with practiced values is shown in FIG. 8. This circuit is derived from FIG. 7 with the only significant variation being the elimination of resistor 15-3 whereby it becomes a part of the potentiometer 15-1'. Performance for this circuit is plotted G in FIG. 9 for several output current values between about 600 $\mu A$ point GA; increasing to 800 $\mu A$ point GB; 1,000 $\mu A$ point GC; and 1200 $\mu A$ point GD. The means for producing a negative $-D.C.$ output from a usual $+V_C$ sourced system is shown in FIG. 10. The gate 30 is shown as a NAND function, because it is desired to inhibit gate action with a $\overline{LOW}$ value. The charge pulses couple through a pump capacitor 32 to a shunt diode 34. This results in a $-D.C.$ output (which is usually further filtered) which bridges across the resistive divider 37-1, 37-2, 37-3 between the $-D.C.$ value and the $+V_C$. Initially the gate input 36 is relatively HIGH due to the potential $+V_C$. As the $-D.C.$ value develops, the ratio action across the potentiometer effects the input 36 to become more negative, or go $\overline{LOW}$ thereby inhibiting the gate hold the output thereof HIGH. This action repeats cyclically as the load demand varies.

The embodiment of FIG. 11 utilizes a separate C-MOS inverter 45, a CD4069 for example, to provide threshold sensing. The decisive signal 46-2 couples with AND gate 40, which together with diode 42 serves to charge capacitor 44. A resistor divider, comprising resistors 47-1, 47-2, 47-3 samples the produced +D.C. output level thereby setting the absolute level at a predetermined value.

Figure 12:
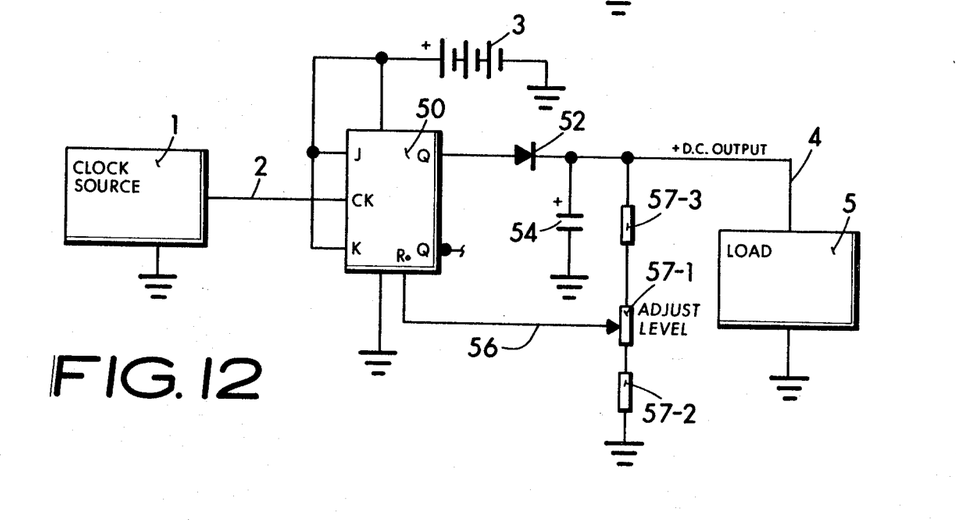
FIG. 12 Embodiment showing the use of a bi-stable logic element as the combination gating device and level detector function.

FIG. 12 finds a circuit combination wherein a clock signal 2 is converted into a resulting charge pulse train having half the periodicity rate and 50% duty cycle. The advantage offered is freedom of the charge pulse waveform from dependence on the clock signal waveform. Therefore excessively long or unusually short duration pulses may be conditioned into a more uniform duty cycle factor. The J-K flip-flop, C-MOS type CD4027 or the like, acts as a divide-by-two counter, steering CLOCK RATE/2 charging pulses through diode 52 to capacitor 54. The proportioned voltage sampled by resistor string 57-1, 57-2, 57-3 couples a value 56 to the reset $R_O$ input, responds to a finite threshold level $+V_I$, inhibiting flip-flop action and holding the Q output LOW when exceeded.

Figures 13, 14:
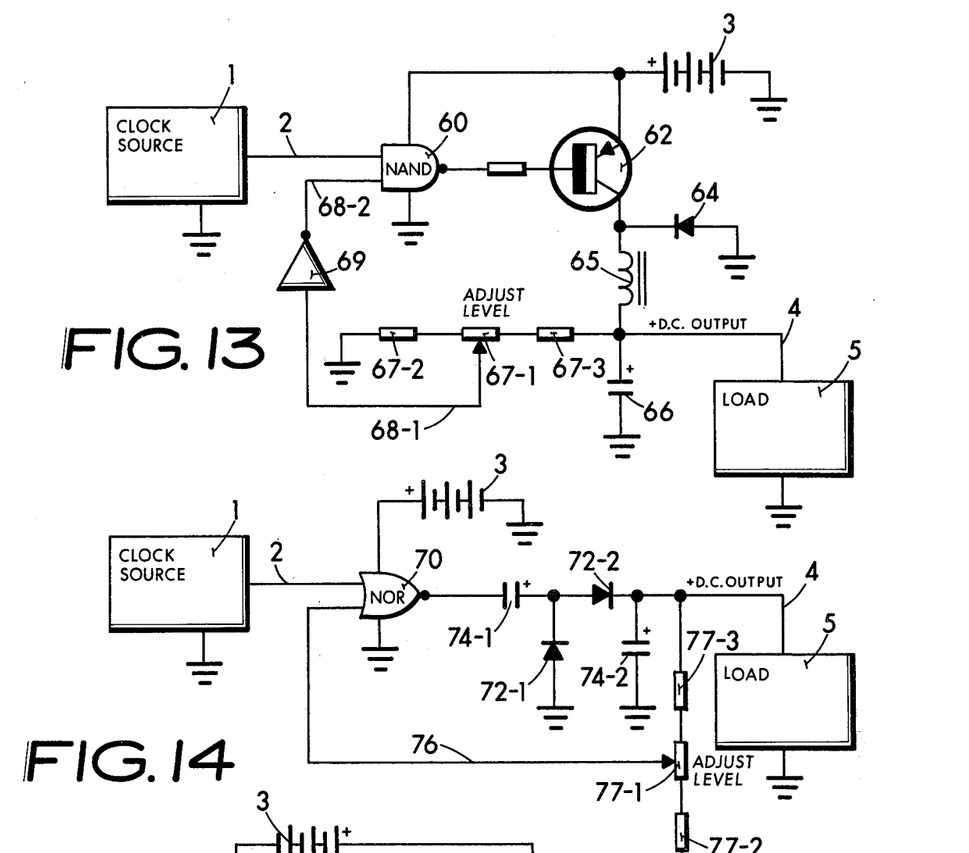
FIG. 13 Circuit arrangement for providing substantially increased power output over what a gate function alone may deliver while retaining the essence of the invention.
FIG. 14 Circuit embodiment showing voltage multiplication to increase the regulated d.c. output potential level.

The developing of more than a few milliamperes of current may be attained by the circuit of FIG. 13. The combination of the inverter 69 and the NAND gate 60 operate much as described for FIG. 11. However, the output of the NAND gate couples with a PNP transistor 62 which acts as a power switch. The result is substantial pulse energy is produced in the collector circuit which couples through ballast choke 65 to charge the capacitor 66. Due to the unilateral character of the transistor, no series steering diode is necessary, although a freewheeling diode 64 is used to return the magnetic energy induced in the choke usefully to the load circuit 5. The bleeder resistor string 67-1, 67-2, 67-3 provides the necessary sample of the D.C. output value for threshold response by the inverter 69 input.

When more voltage output is required than that provided by the $+V_C$ source, the teaching of FIG. 14 comes into play. The NOR gate 70 function is much like that for FIG. 7. The gate output couples with a pump capacitor 74-1, together with diodes 72-1, 72-2 and and capacitor 74-2 which collectively act as a voltage multiplier (in this case, X2). The result is a +D.C. output 4 which is somewhat higher than $+V_C$ depending on the ratio values of the resistor divider 77-1, 77-2, 77-3 which provides the gate control signal 76. Such voltage multiplication can be carried out to higher orders, producing +D.C. outputs substantially higher than $+V_C$ with excellent efficiency.

Figure 15:
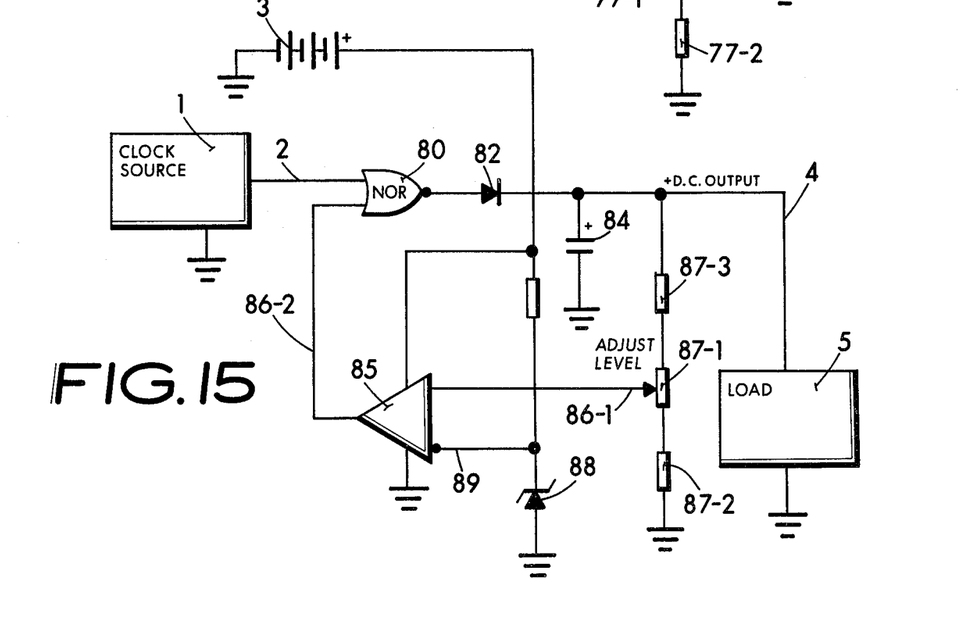
FIG. 15 A separate voltage comparator, including a voltage reference device, is shown to enhance the feedback circuit threshold value sensitivity and thereby overall regulation performance factor.

When more precise regulation is desired than may readily be produced by the elemental circuits extended from that taught in FIG. 1, the inclusion of an operational amplifier effective as a voltage comparator may be provided as in FIG. 15. NOR gate 80 produces charge pulses which couple through diode 82 to charge capacitor 84. The resistor divider 87-1, 87-2, 87-3 provides a sample voltage level 86-1 which couples with the non-inverting input of an operational amplifier, say CA-3140. The inverting input 89 is meanwhile referenced to a stable voltage developed across the zener breakdown diode 88. The result is that, when the value on input 86-1 is LESS than that on input 89, the output 86-2 coupled to the NOR gate is LOW enabling the gate. When the input 86-1 rises to or above the value on input 89, the output 86-2 is HIGH, disabling the gate and stopping further capacitor 84 charge action.

The further extension of these teachings to provide other polarities and potential values will become obvious to the artisan as the gist of the invention reveals itself. For example, negative output from the circuit of FIG. 14 may be accomplished through the expedient of using an OR gate instead of the shown NOR gate, reversing the diode 72-1, 72-2 directions, and adapting the resistor divider 77-1, 77-2, 77-3 to return to $+V_C$ instead of ground, such as taught by FIG. 10.

In view of the foregoing several illustrative teachings, it is obvious that the several objects of the invention are achieved and other advantages are admitted to. As it is reasonable that various changes may be made in the adaptations herein described without materially departing from the useful scope of the invention, it is intended that all the matter contained in the foregoing description or shown in the accompanying drawings shall be interpreted as illustrative rather than in a limiting sense.

What is claimed is:

1. Power supply method whereby an electric potential produced therefrom is effectively made constant through the combination of:
   a. producing a continuum of electric, clock pulse signals;
   b. coupling said clock pulses with a first input of a logic gate element;
   c. producing an output from said gate element effective to produce a substantially unipolar electrical pulse charge across the terminals of an electric charge accumulator;
   d. effectively coupling the electric potential value developed across the said accumulator, to a second input of said logic gate element, said input having an intrinsic electric threshold responsiveness enabling said gate to actively pass said clock pulses from said first input to said output when the accumulated potential is effectively less than said threshold, and further to disable said gate to effectively inhibit the flow of said clock pulses from said first input to said output when the accumulated potential is effectively more than said threshold; and,
   e. dissipative current path actively coupled across the said accumulator acting as a load therefor serving to draw charge from the said accumulator.

2. Power supply method of claim 1 wherein said clock pulse signal is provided from the timing clock pulse train intrinsic in a digital logic system to establish synchronization between the clock pulse timing and any noise pulses produced by the said gate element output.

3. Power supply method of claim 1 wherein said charge across said accumulator, which acts to periodically alternate between an electric potential value above said second input threshold and an electric potential value below said threshold, is further adapted to provide a direct current electric output signal having a pure, substantially constant value to the said dissipative current path.

4. Power supply means whereby an electric potential is produced therefrom which is electrically regulated through the combination of:
   a. a source of electric, clock pulse signal;
   b. gating means having an output and at least two effective control inputs thereto, whereby one said input is coupled with said clock pulse signal as an input thereto;
   c. at least a second said input to said gating means which is substantially bilevel value voltage responsive, whereby when said voltage level is of a first level value said clock pulses coupled with said first input are enabled to actively couple with said gating means output as a signal therefrom, and further when said voltage level is of a second level value said clock pulses coupled with said first input are decoupled with said gating means output resulting in substantially no effective signal therefrom;
   d. unilateral element means coupled with said gating means output and effective therewith to effectively rectify the output signal obtained therefrom;
   e. charge accumulator means having two effective terminals, whereby the first terminal couples with said unilateral element means for receiving unipolar current flow pulses therefrom as an integratively accumulated charge, whilst the second terminal couples with a common return circuit;

f. load impedance means effectively coupled between the first and the second terminal of the said charge accumulator for receiving at least some accumulated charge therefrom;

g. feedback coupling means effective to couple a signal which is a sample of the electric potential value effectively appearing at the said accumulator first terminal with the said gating means second input, thereby serving to control the flow of clock pulses between the first input and the output thereof in proportion to the effective instantaneous electric charge potential across the accumulator terminals; and, h. a source of electric d.c. power coupled with at least the said gating means and the said common return circuit.

5. Power supply means of claim 4 wherein said source of electric clock pulse signal is coupled from the central timing clock of a digital logic system.

6. Power supply means of claim 4 wherein said gating means includes a complimentary metal oxide semiconductor NOR logic gate element which, when enabled, produces a continuum of substantially positive value phases at the output thereof relative to the disabled state.

7. Power supply means of claim 4 wherein said gating means includes a complimentary metal oxide semiconductor OR logic gate element which, when enabled, produces a continuum of substantially negative value pulses at the output thereof relative to the disabled state.

8. Power supply means of claim 4 wherein said gating means includes a complimentary metal oxide semiconductor NAND logic gate function which, when enabled, produces a continuum of substantially negative value pulses at the output thereof relative to the disabled state.

9. Power supply means of claim 4 wherein said gating means includes a complimentary metal oxide semiconductor AND logic gate function which, when enabled, produces a continuum of substantially positive value pulses at the output thereof relative to the disabled state.

10. Power supply means of claim 4 wherein said gating means includes a complimentary metal oxide semiconductor bi-stable element having at least a trigger (clock) input and a voltage level responsive control input thereto and at least one output therefrom, whereby said trigger input receives clock pulses which translate to the said output when the said control input voltage level is of a first level value; and whereby said clock pulses do not translate to the said output when the said control input voltage level is of a second level value.

11. Power supply means of claim 4 wherein said unilateral element means is effectively a semiconductor diode.

12. Power supply means of claim 4 wherein said unilateral element means essentially comprises the collector to emitter circuit of a transistor wherein unilateral current flow is established therethrough by the effect of a clock pulse signal coupled with the base thereof, and usually derived from the output of the said gating means.

13. Power supply means of claim 4 wherein said charge accumulator means is an electric capacitor.

14. Power supply means of claim 13 wherein further an inductor is coupled effectively between the said unilateral element means and the said capacitor for effectively limiting the flow of current therebetween.

15. Power supply means of claim 4 wherein said gating means includes a voltage comparator element having an input thereto coupled with said feedback coupling means, and an output therefrom coupled with said gating means second input.

16. Power supply means of claim 4 wherein said unilateral element means, in combination with said charge accumulator means, is further effective as a rectifier voltage multiplier for increasing the electric potential across the accumulator terminals to exceed the electric signal level delivered by the said gate output.

17. Power supply means of claim 4 wherein said feedback coupling is coupled between the potential bearing first terminal of the charge accumulator and the gating means said second input.

18. Power supply means of claim 4 wherein said feedback coupling provides a signal which is ratioed as a lesser portion of the said potential effectively appearing across the charge accumulator terminals.

19. Power supply means of claim 4 wherein said gating means comprises combinatorial logic means including a said first and a said second input, whereby further said second input is voltage level responsive determinable by a voltage level detector means.

20. Power supply means of claim 4 wherein said gating means comprises combinatorial logic means including a said first and a said second input, whereby further said second input is effectively voltage level responsive as determined by a voltage level comparator means.

21. Power supply means of claim 4 wherein said power supply comprises at least:
   a. said gating means is a C-MOS gate element having at least one voltage level responsive second input;
   b. said unilateral element means is a diode;
   c. said charge accumulator is an electric capacitor;
   d. said feedback coupling means is an active connection between the said gating means second input and the said charge accumulator first terminal.

22. Power supply means of claim 4 wherein a complimentary metal oxide semiconductor based bi-stable element effectively couples in series with the feedback coupling with the said gating means second input; said bi-stable element having at least two inputs thereto and one output therefrom whereby:
   a. a bilevel value voltage responsive control signal input thereto is coupled with said feedback coupling means for receiving a signal therefrom;
   b. a trigger (clock) signal input thereto is coupled with said source of electric, clock pulse signal;
   c. an output therefrom couples with said gating means second input;
   d. primary coaction is produced therebetween such that when a voltage level of a first level value couples with said control signal input an output is produced from the said output when the next time successive active clock transition (edge trigger) occurs which will enable the second input of the said gating means;
   e. secondary coaction is produced therebetween such that when a voltage level of a second level value couples with said control signal input an output is produced from the said output when the next time successive clock transition (edge trigger) occurs which will disable the second input of the said gating means;

f. continued coaction is produced therebetween such that the bistable element variously transitions back and forth between a state of primary coaction and secondary coaction relative to the momentary average electric potential effectively apparent across the charge accumulator.

23. Power supply means of claim 4 wherein said gating means includes a combinatorial logic means having at least two inputs and one output, whereby:

a. first input is responsive to said clock pulse signals;

b. second input is effectively bilevel value voltage responsive;

c. output produces alternation between active flow of clock pulse signal, and no signal, therefrom in response to the responsive state of the said second input.

24. Power supply means of claim 4 wherein said feedback coupling means effectively includes a variable resistance element therewithin which provided adjustability of voltage level responsive feedback producing thereby a variation of the integrative charge collected in the charge accumulator.

* * * * *